US008105455B2

(12) United States Patent
Weber et al.

(10) Patent No.: US 8,105,455 B2
(45) Date of Patent: Jan. 31, 2012

(54) FILM TRANSFER UNIT HAVING AN INTEGRATED FURTHER PROCESSING DEVICE AND METHOD FOR TRANSFERRING A TRANSFER LAYER FROM A CARRIER FILM ONTO A PRINT CARRIER

(75) Inventors: Alexander Weber, Weinheim (DE); Andreas Krispin, Mühlheim (DE); Joachim Sonnenschein, Mühltal (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1352 days.

(21) Appl. No.: 11/725,218

(22) Filed: Mar. 16, 2007

(65) Prior Publication Data

US 2008/0251190 A1 Oct. 16, 2008

(30) Foreign Application Priority Data

Mar. 31, 2006 (DE) ........................ 10 2006 015 474

(51) Int. Cl.

| | |
|---|---|
| ***B44C 1/165*** | (2006.01) |
| ***C09J 5/04*** | (2006.01) |
| ***C09J 5/06*** | (2006.01) |
| ***B65C 11/02*** | (2006.01) |
| ***B65H 37/02*** | (2006.01) |
| ***B32B 37/10*** | (2006.01) |
| ***B32B 37/12*** | (2006.01) |
| ***B32B 37/14*** | (2006.01) |
| *B44C 1/24* | (2006.01) |
| *B31F 1/00* | (2006.01) |
| *B32B 37/22* | (2006.01) |

(52) U.S. Cl. ........ 156/235; 156/384; 156/387; 156/388; 156/459; 156/540; 156/582; 156/234; 156/240; 156/305

(58) Field of Classification Search .......... 156/230–241, 156/384, 387, 459, 540, 582, 244.19, 273.5, 156/305, 331.1, 388, 389, 522
See application file for complete search history.

(56) References Cited

U.S. PATENT DOCUMENTS 3,124,069 A * 3/1964 Krueger et al. ............... 101/492
(Continued)

FOREIGN PATENT DOCUMENTS

DE 699 03 603 T2 8/2003
(Continued)

OTHER PUBLICATIONS

"Prindor: Neue Technologie Der Folienpraegung—Heiss Oder Kalt?" Deutscher Drucker, Deutcher Drucker Verlagsgesellschaft, Olstfildern, Germany, vol. 32 No. 14/15, Apr. 18, 1996, p. G15, XP000584416.

(Continued)

*Primary Examiner* — Sonya Mazumdar
(74) *Attorney, Agent, or Firm* — Laurence a. Greenberg; Werner H. Stemer; Ralph E. Locher

(57) ABSTRACT

A printing machine contains a transfer unit for transferring a transfer layer onto a print carrier in a transfer nip. The printing machine further has at least one applicator unit for applying an adhesive to the print carrier. The applicator unit precedes the transfer unit, and the transfer layer is detached from the carrier film in the transfer unit in the regions in which adhesive is applied. By printing units being converted into transfer units or applicator units, the functionality of the printing unit for a printing operation is lost. If the applicator device and the transfer device are located in this order on an impression cylinder of a printing unit, the applied adhesive is not predried sufficiently. To overcome these disadvantages, the transfer unit is a further processing unit and has at least one further processing device which follows the transfer nip and which acts on the print carrier.

9 Claims, 4 Drawing Sheets

U.S. PATENT DOCUMENTS

| | | | | | |
|---|---|---|---|---|---|
| 3,573,136 | A * | 3/1971 | Gardner | 156/384 |
| 5,565,054 | A | 10/1996 | Lappe et al. | |
| 5,569,348 | A * | 10/1996 | Hefele | 156/239 |
| 6,006,663 | A * | 12/1999 | Kropp et al. | 101/216 |
| 6,302,016 | B1 | 10/2001 | Fausto et al. | |
| 6,808,584 | B2 * | 10/2004 | Kasbauer | 156/231 |
| 2007/0215288 | A1 * | 9/2007 | Weber et al. | 156/384 |
| 2009/0205772 | A1 * | 8/2009 | Franzen et al. | 156/234 |
| 2009/0294038 | A1 * | 12/2009 | Jurkewitz et al. | 156/234 |

FOREIGN PATENT DOCUMENTS

| | | | |
|---|---|---|---|
| EP | DE4110801 | C1 * | 5/1992 |
| EP | 0 578 706 | B1 | 11/1994 |
| EP | 0985548 | A1 * | 8/2003 |
| EP | 1839860 | A2 * | 10/2007 |
| WO | WO 2004/002741 | A1 | 1/2004 |
| WO | WO 2005/049322 | A1 | 6/2005 |
| WO | WO 2005049322 | A1 * | 6/2005 |
| WO | 2005/100024 | A1 | 10/2005 |
| WO | WO 2005/100028 | A1 | 10/2005 |
| WO | WO200510024 | A1 * | 10/2005 |
| WO | WO 2005100024 | A1 * | 10/2005 |
| WO | WO 2005100028 | A1 * | 10/2005 |

OTHER PUBLICATIONS

European Search Report dated Jan. 9, 2009.

* cited by examiner

FILM TRANSFER UNIT HAVING AN INTEGRATED FURTHER PROCESSING DEVICE AND METHOD FOR TRANSFERRING A TRANSFER LAYER FROM A CARRIER FILM ONTO A PRINT CARRIER

CROSS-REFERENCE TO RELATED APPLICATION

This application claims the priority, under 35 U.S.C. §119, of German application DE 10 2006 015 474.6, filed Mar. 31, 2006; the prior application is herewith incorporated by reference in its entirety.

BACKGROUND OF THE INVENTION

Field of the Invention

The present invention relates to a printing machine, containing at least one transfer unit for transferring a transfer layer from a carrier film, which together form a transfer film, onto a print carrier. The transfer unit contains a film transfer cylinder and an impression cylinder. The film transfer cylinder is thrown onto the impression cylinder and forms with the latter a transfer nip. The print carrier is transported through the transfer nip along a transport path for the transfer of the transfer layer. The printing machine further includes at least one applicator unit for the at least regional application of an adhesive onto the print carrier, the applicator unit precedes the transfer unit, and the transfer layer is detached from the carrier film in the transfer unit in the regions in which the adhesive is applied to the print carrier.

The method of cold film embossing, as it is known, preferably applies to this apparatus.

In cold film embossing, a transfer layer is transferred from a carrier material onto a print carrier.

The carrier material used is a carrier film. A lacquer layer, responsible particularly for the inking of the transfer layer, is applied to the carrier film. Joined to the lacquer layer is an aluminum layer which gives rise to the metallic gloss of the transfer layer. Further, a further bonding layer may also be provided on an aluminum layer and improves the bonding properties of the transfer layer with the adhesive on the print carrier. The layers which are transferred from the carrier material are designated as a transfer layer.

To transfer the transfer layer onto a print carrier, the transfer film, together with the print-carrier, is led through a transfer nip. The transfer nip is formed by a transfer cylinder and an impression cylinder which bear one against the other. The transfer cylinder and impression cylinder are thrown in rotation onto one another with a force such that the transfer layer is transferred onto the print carrier in the transfer nip.

So that a regional transfer of the transfer layer onto the print carrier can take place, before film transfer the print carrier is provided with an adhesive layer which corresponds to the region in which a film is transferred.

The adhesive used may be a colorless adhesive, an adhesive with a specific inherent color or else an adhesive colored correspondingly to the film. For the transfer of metal particles, it is already known, if only from the bronzing technique, to use a particularly tacky ink, the coloring of which corresponds to the desired metallization. To that extent, of course, a tacky ink may also be used alternatively to a colored adhesive.

The transfer layer may be substantially a metal layer, but also other layers. For example, an aluminum layer may be provided, which is applied, as required, to a yellow/golden lacquer layer or a silver-colored lacquer layer.

Moreover, the transfer layer used may also be a colorless layer formed, for example, of PE film, which is transferred onto the print carrier such that it forms a protective layer there.

It is also possible to use a conductive layer as a transfer layer, as a result of which electrically and/or thermally conductive regions can be transferred onto the print carrier. The transfer of prepared delimited layer regions as a transfer layer is also possible, and these may be, for example, RFID chips or their antennae. Suitable ceramics may also be transferred. In this way, it is conceivable that even superconductive structures can be transferred onto a print carrier.

An apparatus for cold film embossing is presented in European patent EP 0 578 706 B1, corresponding to U.S. Pat. No. 5,565,054.

In this, the cold film embossing takes place within a multicolor printing machine. The print carrier is transported along a predetermined transport path in the printing machine. The print carrier may be, for example, paper sheets, cardboard or even rolls.

In a first printing unit of the printing machine, an adhesive is transferred onto the print carrier instead of an ink. For the regional application of the adhesive, a correspondingly imaged printing plate is tension-mounted in the printing unit, and the adhesive is transferred onto the print carrier in the same way as a conventional offset printing ink. Such a printing unit applying adhesive is designated as an applicator unit.

The print carrier is then transported further on into a second printing unit. In the second printing unit, the impression cylinder and the rubber blanket cylinder are configured as a transfer unit.

In the region of the second printing unit, a film module with a transfer film stock roll and with a transfer film collection roll is located. Via intermediate rollers of a film guide device, the film is led as a transfer film web from the transfer film stock roll to the transfer nip and further on to the transfer film collection roll.

To transfer the transfer layer onto the print carrier, the transfer film web and the print carrier having the regional adhesive layer are led jointly through the transfer nip such that the transfer layer lies on the adhesive layer. The transfer layer is then transferred onto the print carrier in the transfer nip with pressure. By the adhesive, the transfer layer is in this case removed cleanly from the transfer film.

For a clean transfer of the transfer layer onto the print carrier, the film and the print carrier are driven at the same speed in the region of the transfer nip during transfer.

In a following press unit, action is then taken substantially on the transferred transfer layer, so that a permanency of the film deposit is achieved.

In this known apparatus, therefore, a printing unit of a printing machine is used as an applicator unit, and at least one second printing unit is required for the film transfer onto the print carrier. The press unit may be integrated into the second printing unit. If, for example, a four-color offset printing machine is concerned, which is configured for transferring a transfer layer onto a print carrier, then, according to the apparatus described here, at least two printing units are occupied by the devices which at least assist the film transfer. For further treatment of the print carrier before or after the film transfer, only two printing units, overall, in which, for example, further ink application can take place, are available.

In order to increase the number of printing units available for further processing of the print carrier, International Patent Disclosure WO 2005/100028 A1 proposes to accommodate all the devices involved in the film transfer in a printing unit. For this purpose, both an applicator device and a transfer cylinder are disposed one behind the other on the same impression cylinder. Further, a calendering roller, too, following the transfer cylinder, can be thrown against the impression cylinder. An integrated film module is formed in this way, which contains all the devices necessary for film transfer, such as the applicator, transfer and calendering devices. The calendering device is in this case assigned functionally to the transfer device and presses the transfer film in onto the print carrier, so that bonding is to be improved.

By use of the integrated film module, although the disadvantage of the prior art that at least two printing units for a printing machine for film transfer are no longer available to be used for further processing, for example a printing of the print carrier, is reduced, nevertheless all the elements which have to be used for film transfer, such as the applicator device and transfer cylinder, are disposed very close to one another. Further treatment of the print carrier after adhesive application and before film application is virtually impossible. Due to the short distance between the adhesive application and the film transfer, a predrying of the adhesive, which is sought after where appropriate, cannot be achieved before the film application, and as a result of this defects in the quality of the transferred transfer layer due to a different detachment behavior from the transfer film may occur.

SUMMARY OF THE INVENTION

It is accordingly an object of the invention to provide a film transfer unit having an integrated further processing device and a method for transferring a transfer layer from a carrier film onto a print carrier that overcome the above-mentioned disadvantages of the prior art devices and methods of this general type, and at the same time, restricts to a minimum at least the number of printing units which are used with devices for film transfer such that further processing of the print carrier can no longer take place here.

With the foregoing and other objects in view there is provided, in accordance with the invention, a printing machine. The printing machine contains at least one transfer unit for transferring a transfer layer from a carrier film, which together form a transfer film, onto a print carrier. The transfer unit includes a film transfer cylinder and an impression cylinder, the film transfer cylinder is thrown onto the impression cylinder and forms with the impression cylinder a transfer nip. The print carrier is transported through the transfer nip along a transport path for a transfer of the transfer layer. The transfer unit is a further processing unit of the printing machine and has at least one further processing device following the transfer nip and acting on the print carrier. At least one applicator unit is provided for an at least regional application of an adhesive onto the print carrier. The applicator unit precedes the transfer unit, and the transfer layer is detached from the carrier film in the transfer unit in regions in which the adhesive is applied to the print carrier.

The term "printing machine" may also be understood here to mean in general a sheet-processing machine. In a particularly preferred embodiment, it will, then, be a printing machine, in particular an offset sheet-fed printing machine.

There is provision for the transfer unit to be a further processing unit of the printing machine and to have at least one further processing device which follows the transfer nip and which acts on the print carrier.

The further processing device has the transfer unit in addition to the transfer nip by which film transfer is achieved. Furthermore, adhesive application takes place in an applicator unit which precedes the transfer unit. Here, the adhesive is transferred, for example, as described, onto the print carrier image-to-image via a conventional offset printing unit with a printing plate and rubber blanket cylinder. Owing to the spatial separation of the applicator unit and transfer unit, further action on the adhesive-loaded print carrier before film transfer can become possible. In particular, if only because of the longer drying distance, a better bonding action of the adhesive is achieved.

In particular, sheet-like print carriers, such as paper, cardboard, films, corrugated cardboard or the like, may be considered as a print carrier.

Thus, in the further processing unit, both a device for film transfer and a device for the further processing of the print carrier are provided. In particular, this may be a conventional further processing unit of the printing machine with conventional further processing devices. Elements for the film transfer can then be made ready in this further processing unit. These elements are, in particular, a film transfer cylinder, around which the transfer film web is guided, and an impression cylinder, onto which the film transfer cylinder is thrown. Further, film guide devices for guiding the transfer film web may also be provided. This further processing unit can then be used for the further processing of the print carrier in exactly the same way as would be possible without a transfer of the transfer film onto the print carrier. Consequently, only a minimum of printing or further processing units of the printing machine are used for the film transfer such that they are no longer available for conventional further processing steps of the print carrier. In particular, a reduction in the usable further processing units of the printing machine becomes necessary solely in the case of the applicator units. In this application, the term "film transfer cylinder" is also designated more succinctly as a transfer cylinder. If cylinders for the transfer of sheets are described, these are designated as sheet transfer cylinders or express reference is made to the use.

In a further development according to the invention of the printing machine, the further processing device is thrown at least temporarily onto the impression cylinder and follows the transfer nip.

In terms of the method, there is provision for adhesive to be transferred at least regionally onto a print carrier in an applicator unit. The regional adhesive application may in this case take place, in particular, image-to-image, such that a desired image-to-image film transfer is achieved. In a transfer unit following the applicator unit, the transfer layer is transferred from the carrier film onto the print carrier in a transfer nip formed by a transfer cylinder and an impression cylinder. In a final step, a further processing of the print carrier is then carried out in the transfer unit by a further processing device following the transfer nip, after the carrier film has been transferred onto the print carrier.

The transfer unit can thereby be used for the further processing of the print carrier in exactly the same way as a conventional further processing unit of the printing machine. In the case of adhesive application in only one unit, only one unit is used for film transfer such that it is not available for conventional further processing.

Advantageously, there is provision for the further processing device to have a functionality independent of the film transfer. Therefore, the functionality of the further processing unit, that is to say of the transfer unit, is increased, since a function which is different from film transfer is expressly provided. The function of the further processing unit can in this case be performed to the intended extents even without a film being transferred onto the print carrier by the transfer nip. In particular, there may be provision for the transfer cylinder to be configured so as to be capable of being thrown off at least temporarily from the impression cylinder. A separation between the transfer film web and the print carrier can thereby take place. By the further processing device which follows the transfer nip, a further processing of the print carrier can then continue to take place independently of the film transfer. The further processing may take place even after a film transfer, so that action is taken on the coated print carrier. However, the state of the print carrier (coated or not coated) does not in any way change the functionality of the further processing device.

There is beneficially also provision for even regions of the print carrier which are not loaded with a transfer layer to be processed by the further processing device, and in this way a finishing of the entire sheet can be achieved, irrespective of whether only regions of the print carrier or the entire print carrier or even no region of the print carrier are coated with the transfer layer. In the event that no film transfer takes place, the printing machine may likewise also be operated as a conventional printing machine with a conventional further processing unit instead of the transfer unit. In this situation, the applicator unit, too, may be operated as a conventional printing unit, since the adhesive has been transferred via a conventional printing plate and a rubber blanket cylinder.

In a further advantageous embodiment, there is provision whereby both the applicator unit and the transfer unit are a further processing unit of the printing machine and, in addition to an applicator device for applying adhesive to a print carrier, also have at least one further processing device for the further processing of the print carrier, the further processing device preceding the applicator device. In this way, the applicator unit, too, may be used at the same time for adhesive application and as a conventional further processing unit of the printing machine, and, on the one hand, the diversity of possible further processing steps in the printing machine is increased, while, on the other hand, there are no longer any previously provided further processing units of the printing machine which cannot be used for further processing on account of devices for film transfer.

In an advantageous development, there is provision for the applicator device to be thrown onto an impression cylinder in the applicator unit and to form with this an applicator nip in which adhesive is transferred onto the print carrier. The further processing device is then advantageously thrown at least temporarily onto the same impression cylinder and in this case precedes the applicator device. Thus, as compact a form of the applicator unit as possible with integrated further processing can be achieved. In particular, there may also be provision for the applicator unit to be a conventional further processing unit which has been supplemented by a corresponding applicator device.

As a particularly advantageous embodiment, there is provision for the further processing devices to contain either a rubber blanket cylinder, a punching cylinder, a cutting unit, a numbering unit, a perforating unit, a structuring unit, an applicator device for adhesive, a film transfer device or an embossing unit. In particular, the further processing devices of the transfer unit and of the applicator unit may be different devices. High flexibility can thereby be achieved.

There is provision, further, for the further processing unit to be a unit for finishing the print carrier, which can finish regions of the print carrier without a transferred transfer layer.

In this case, selectively, one of the following types may be concerned, either an offset printing unit, an anilox printing unit, a lacquering unit, a perforating unit, a punching unit, a scoring unit, a numbering unit, a cutting unit, an embossing unit or another printing unit of the printing machine. Thus, when the further processing unit is used as a transfer unit, its functionality can continue to be preserved. The same also applies to the applicator unit which may be another further processing unit.

By the further processing units provided, there is provision, according to the invention, for the further processing of the print carrier to involve action upon the print carrier by printing ink or lacquer by an anilox, offset or other printing method or a perforation, punching, scoring, cutting or embossing of the print carrier.

For this method, there may advantageously be provision for the further processing device, according to the invention, to be thrown at least temporarily onto the same impression cylinder which together with the transfer cylinder forms the transfer nip, the further processing device following the transfer nip. Likewise, a corresponding further processing device can be thrown onto the same impression cylinder as the applicator device of the applicator unit, but here, as already described, it then precedes the applicator nip.

In particular, there is provision for the further processing unit to be an offset printing unit, the rubber blanket cylinder then being an integral part of the further processing device. The rubber blanket cylinder and consequently the further processing device may, in a development be configured such that it can temporarily be thrown off from the impression cylinder. Film transfer can thus take place, uninfluenced by the further processing device.

There may also be provision for the offset printing device to remain constantly thrown onto the impression cylinder. In this way, too, a further printing operation can always be carried out. This is independent of the film transfer.

In particular, there may be provision for the film transfer cylinder to be thrown off from the impression cylinder when only a printing method is to be carried out by the further processing unit, that is to say by the printing unit.

This functionality may be provided correspondingly for other further processing steps in the printing machine which are independent of the film transfer just carried out in this unit. In a particular embodiment, there may, for example, also be adhesive application by an applicator device. This adhesive application on the print carrier then allows a further film transfer in a following transfer unit.

In particularly advantageous embodiments of the invention, there is provision for the printing machine to contain a drying device, following the applicator unit and preceding the transfer nip, for predrying the adhesive applied in the applicator unit.

In an alternative embodiment, there is provision for a UV adhesive to be applied in the applicator unit and for the printing machine to contain a UV device, following the applicator unit and preceding the transfer nip, for acting with UV radiation upon the UV adhesive applied in the applicator unit, in order to activate the UV adhesive.

Depending on which adhesive is used, its bonding action may then be reinforced or activated by a corresponding drying device or UV device.

Other features which are considered as characteristic for the invention are set forth in the appended claims.

Although the invention is illustrated and described herein as embodied in a film transfer unit having an integrated further processing device and a method for transferring a transfer layer from a carrier film onto a print carrier, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
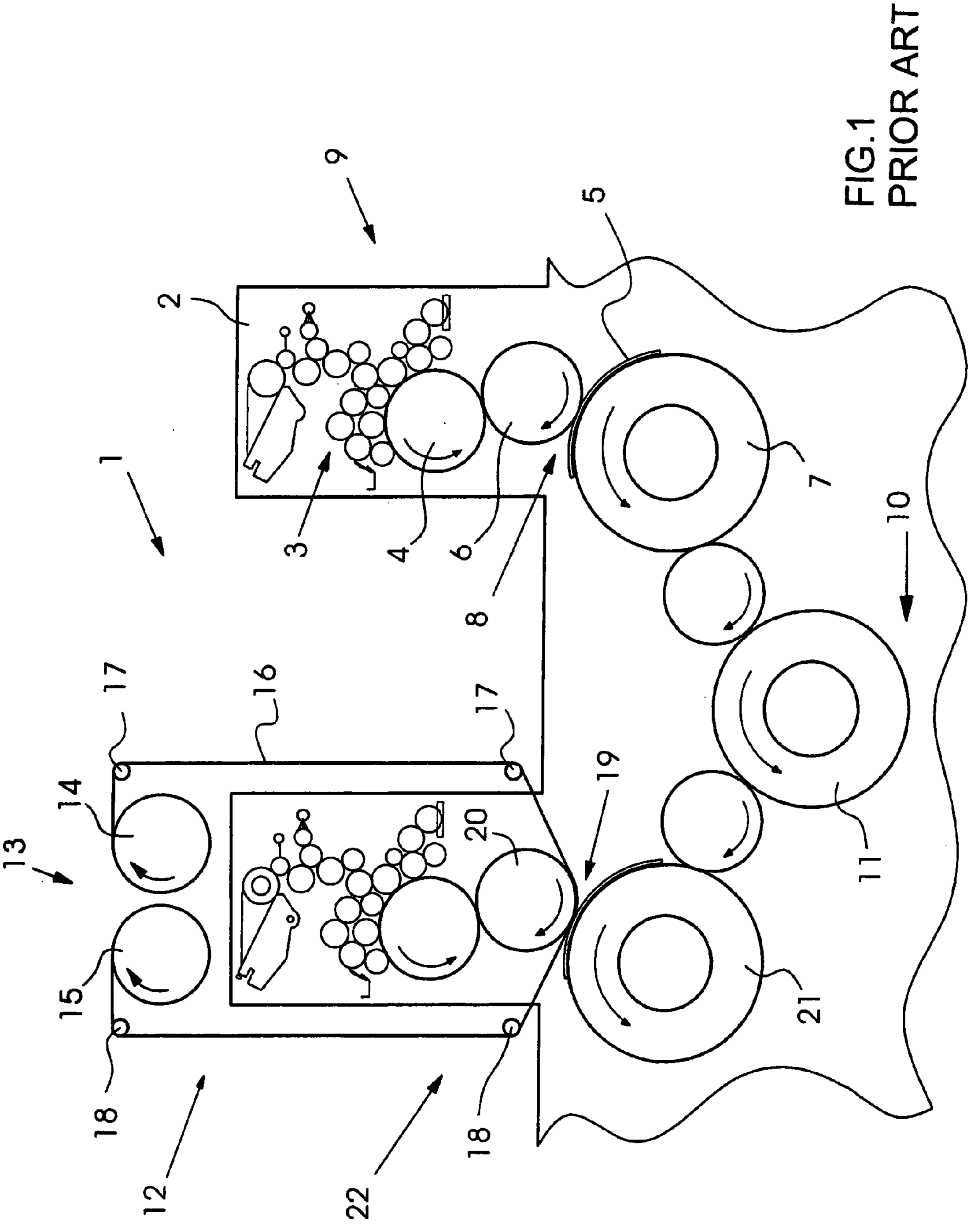
FIG.1 PRIOR ART
FIG. 1 is a diagrammatic, side view of a film transfer device according to the prior art.

Referring now to the figures of the drawing in detail and first, particularly, to FIG. 1 thereof, there is shown a detail of a printing machine with a film transfer device 1. A first printing unit of the printing machine, the printing unit serving here as an applicator unit 2, is illustrated. In the applicator unit 2, adhesive is applied via an inking unit 3 to a printing plate cylinder 4 having a non-illustrated printing plate. For this purpose, the printing plate is imaged such that it receives adhesive in the regions which correspond to a coating, desired to be image-to-image, of a sheet 5 with a transfer layer. The adhesive is transferred further onto a rubber blanket cylinder 6 via the printing plate cylinder 4. The rubber blanket cylinder 6 is thrown onto an impression cylinder 7 and, together with the latter, forms an applicator nip 8. The rubber blanket cylinder 6 forms, together with the printing plate cylinder 4, with the inking unit 3, and, if appropriate, with elements, not illustrated here, such as, for example, where appropriate, a dampening unit, associated functionally with adhesive application, an applicator device 9 which is thrown onto the impression cylinder 7 in the way illustrated here.

The print carrier used is the sheet 5 which is transported along a transport direction 10 through the printing machine by non-illustrated transport elements. It is in this case led through the applicator nip 8 where it is loaded with the adhesive image-to-image. For transporting the sheet 5, the impression cylinder 7 may have grippers which grip the sheet at its leading edge and guide it through the applicator nip 8. The applicator nip 8 is formed by the impression cylinder 7 and the rubber blanket cylinder 6 and, when no film transfer is carried out in the printing machine, is a conventional printing nip, in which ink can be transferred from the printing plate onto the sheet 5 via the rubber blanket cylinder 6.

After adhesive application in the applicator unit 2, the sheet 5 is transported via sheet transfer cylinders 11 to a transfer unit 12. The transfer unit 12 has a film module 13 with a transfer film stock roll 14 and with a transfer film collection roll 15. The transfer film collection roll 15 may also be provided separately from the transfer film stock roll 14.

A transfer film web 16 is made available, rolled up, on the transfer film stock roll 14. The transfer film web 16 is led to a transfer nip 19 via deflection rollers 17 and 18. The transfer nip 19 is formed by a transfer cylinder 20 and an impression cylinder 21 which are thrown one onto the other. The transfer unit 12 may be a printing unit of the printing machine which is set up such that a transfer of a transfer layer from the transfer film onto the sheet 5 can be carried out. The transfer cylinder 20 is then a rubber blanket cylinder.

The sheet 5 is led, together with the transfer film web 16, through the transfer nip 19 at the same speed. In the regions of the sheet 5 on which adhesive has been applied, the transfer layer of the transfer film remains bonded and is removed from a carrier film of the transfer film web 16. To assist the bonding action of the adhesive, there may be provision for the transfer layer to be pressed onto the sheet 5 by a calendering nip, not illustrated here, which follows the transfer nip.

More further processing units, such as, for example, printing units, of the printing machine may also be provided upstream of the applicator unit 2 and downstream of the transfer unit 12. The sheet 5 can thereby be printed both before film transfer and also after this. However, no more further processing of the sheet 5 can take place in the two printing units which are used as the applicator unit 2 and as the transfer unit 12.

According to a further embodiment of the prior art which is not illustrated here, there may be provision for all the devices involved in the film transfer to be provided in the transfer unit 12, that is to say the applicator device 9, a transfer device 22, which may be formed at least from the transfer cylinder 20 and, if appropriate, from deflection rollers 17, 18, and a calendering device. In this case, a further unit of the printing machine can then be utilized as a further processing unit. However, the applicator device 9 and the transfer device 22 then move back into a common unit where they are thrown onto the same impression cylinder 21. The distance between adhesive application and film transfer is reduced considerably and may lead to problems in the bonding action of the adhesive.

Figure 2:
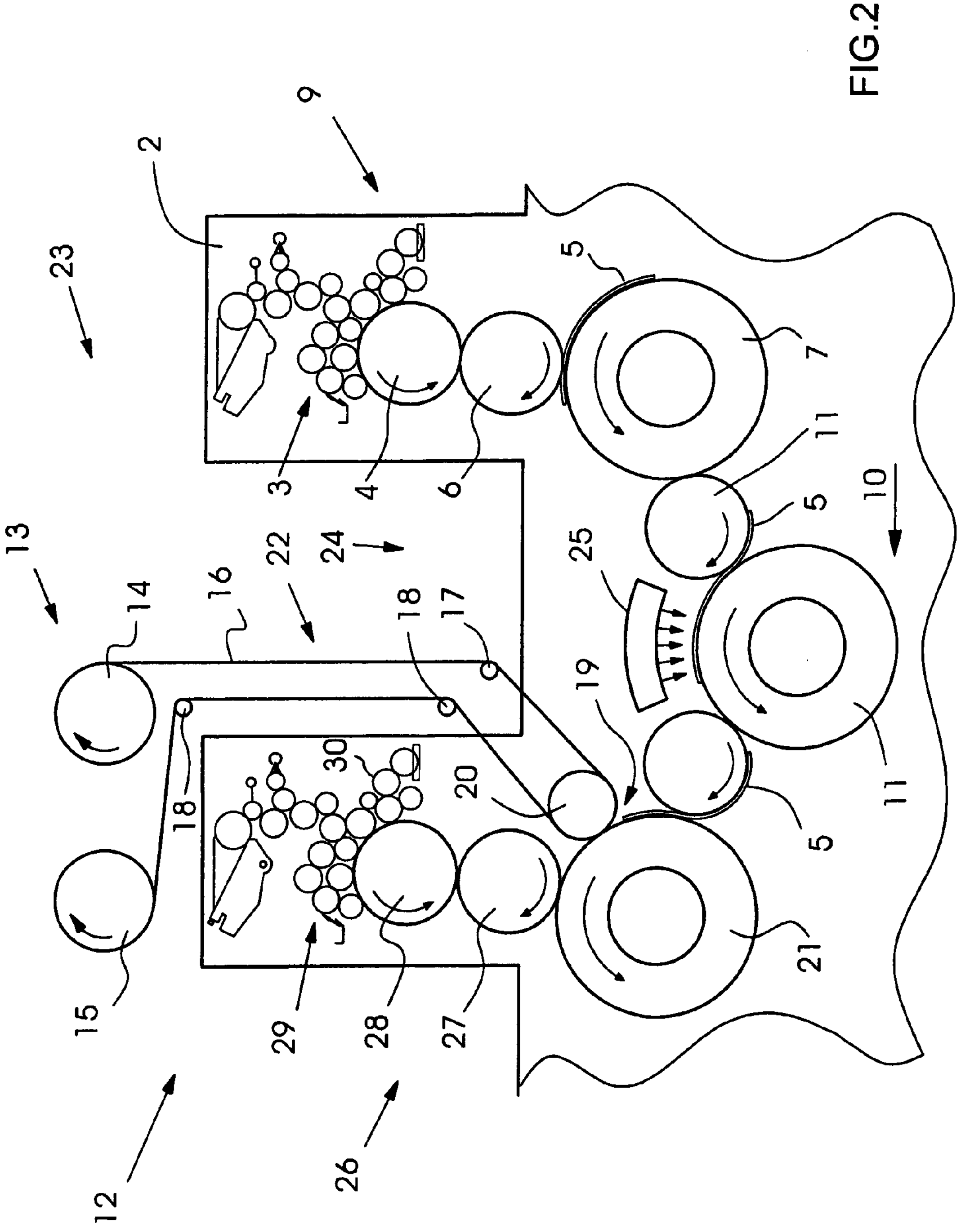
FIG. 2 is a diagrammatic, side view of the film transfer unit with a further processing device according to the invention.

FIG. 2 shows a film transfer device 23 according to the invention. Identical elements are designated by the same reference symbols as in FIG. 1.

As described with regard to FIG. 1, the adhesive is transferred image-to-image onto the sheet 5 in the applicator unit 2. The sheet 5 is then transported along the transport direction 10 to the transfer unit 12 via the sheet transfer cylinders 11.

In the region between the applicator unit 2 and the transfer unit 12, which region may be a walk-on region 24 of the printing machine, an adhesive activation device 25 is provided, which can act on the adhesive layer on the sheet 5 and activate or reinforce the bonding action of the adhesive (FIG. 2). Depending on the adhesive used in the applicator unit 2, this may be a drying device 25 or, if a UV adhesive is used, a UV radiation device 25 which only activates the UV adhesive.

In the case of an adhesive, the bonding action of which is improved by the penetration of solvents, if appropriate, even only the transport distance from the applicator unit 2 to the transfer unit 12 is sufficient to ensure an adequate bonding action of the adhesive, the adhesive activation device 25 then not being absolutely necessary, but nevertheless being capable of improving the bonding action.

The print carrier 5 is then supplied to the transfer unit 12 via the sheet transfer cylinders 11.

The transfer film web 16 is led via the deflection rollers 17, 18 to the transfer nip 19 and away from the latter. The transfer film web 16 and the sheet 5 are led through the transfer nip 19 at substantially the same speed, and, as described above, the transfer layer of the transfer film is transferred onto the sheet 5. In order to improve transfer, the transfer cylinder 20 is thrown with pressure onto the impression cylinder 21. A calendering of the transfer film on the sheet 5 is then not necessary.

After the transfer of the transfer layer onto the sheet 5, the latter is led further on to the impression cylinder 21 and transported to a further processing device which is thrown onto the same impression cylinder 21 as the transfer cylinder.

The further processing device is, here, an offset printing device 26 which contains, at least in this example, a rubber blanket cylinder 27, a printing plate cylinder 28, an inking unit 29 and a dampening unit 30. The rubber blanket cylinder 27 is in this case thrown onto the impression cylinder 21 such that together they form a printing nip 31. Instead of an offset printing device, an anilox printing device, an embossing, numbering or cutting device or a similar device which acts on the sheet may also be provided here.

The transfer unit 12 is a further processing unit, in this example an offset printing unit of the printing machine. By the offset printing device 26 of the printing unit, ink can be transferred onto the sheet 5 via the printing nip 31. In addition to the offset printing device 26, the offset printing unit also has, as described, the transfer device 22 which in this case, however, contains an extra transfer cylinder 20 which is not the rubber blanket cylinder 27 of the printing unit itself. By the transfer device 22, the further processing unit, that is to say, here, the offset printing unit, becomes the transfer unit 12. The transfer unit 12 then also contains the further processing device, here the offset printing device 26, in addition to devices which serve for film transfer.

More further processing units, not shown here, in particular printing units of the printing machine, may also be provided, following the transfer unit 12 and/or preceding the applicator unit 2. The printing machine may also likewise have further applicator units and transfer units. It is in this case possible, for example, for one transfer unit to be assigned a plurality of applicator units, so that thicker layers of adhesive can be achieved on the sheet 5. Thicker adhesive layers may improve the detachment behavior of the transfer layer of the transfer film.

Figure 3:
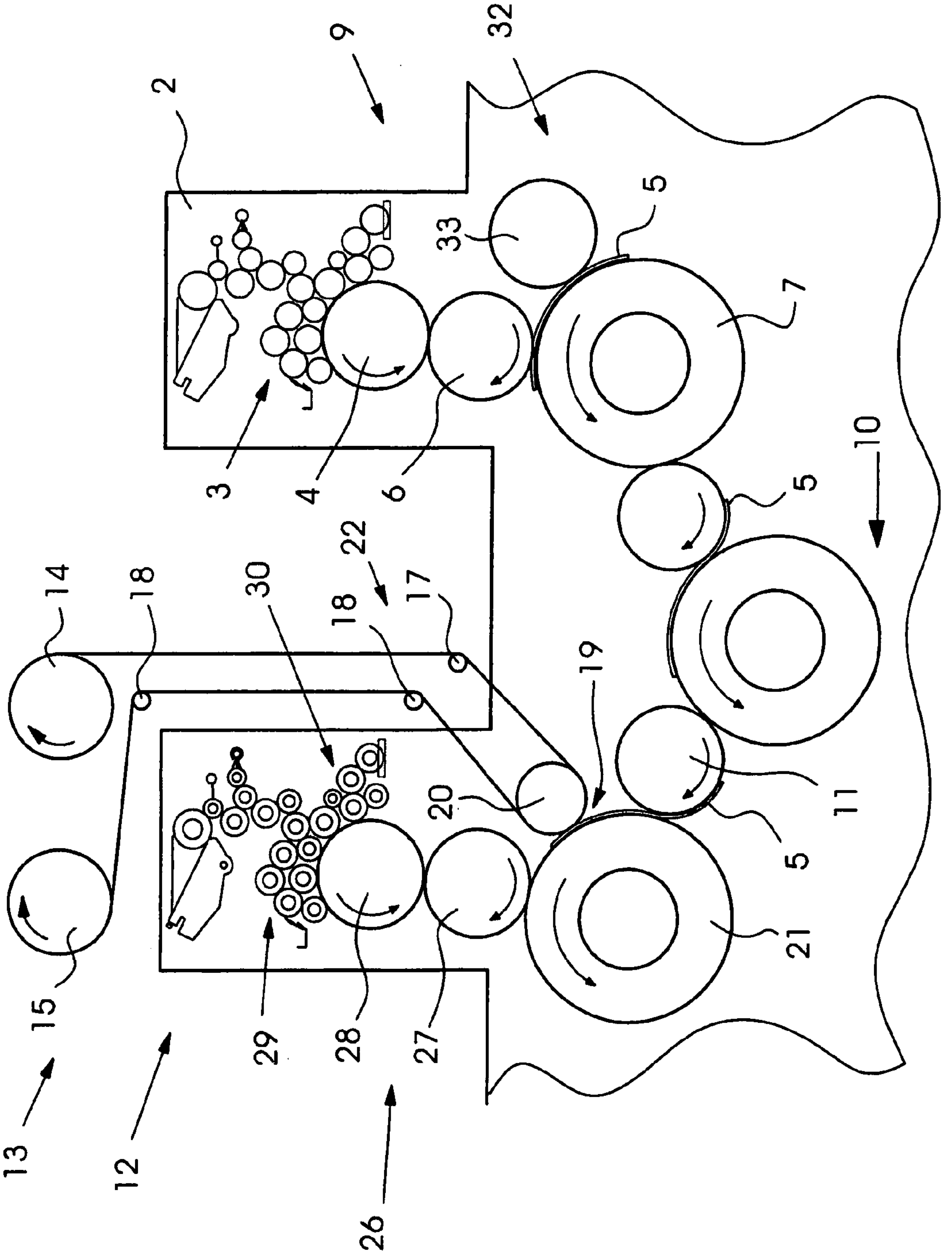
FIG. 3 is a diagrammatic, side view of the film transfer unit and an applicator unit, in each case with further processing devices.

A further development of the printing machine according to the invention is illustrated in FIG. 3. The same elements as in FIGS. 1 and 2 are given the same reference symbols.

As described with regard to FIG. 2, here, the transfer unit 12 is an offset printing unit of the printing machine which has been extended by a transfer device 22. The functionality of the offset printing unit, even when it is used as a transfer unit 12, is thereby preserved. In the transfer unit 12, a transfer layer is transferred onto the sheet 5 in the transfer nip 19. Subsequently, a conventional further processing of the sheet 5 in the form of an offset printing method also takes place in the transfer unit 12.

Before a transfer layer is transferred to the sheet 5 in the transfer unit 12, here too, as described above, an adhesive layer is transferred image-to-image onto the sheet 5 in the applicator unit 2. After adhesive application, the sheet 5 is transported along the direction 10 to the transfer cylinder 12 via sheet transfer cylinders 11. Whereas FIG. 2 illustrates an adhesive activation device 25 which ensures a drying or UV activation of the adhesive, a corresponding illustration has been dispensed with here, so as to make it clear that, for an adhesive having a tackiness increased by drying, even the longer transport path from the applicator unit 2 to the transfer unit 12 results in an improvement in the bonding behavior, without an adhesive activation device 25 being absolutely necessary.

As illustrated in FIG. 1 and FIG. 2, the applicator unit 2 serves solely for applying adhesive to the sheet 5. The applicator unit 2 is in this case a conventional printing unit of the printing machine in which adhesive is transferred onto the sheet 5 instead of ink.

In contrast to the prior art according to FIG. 1 and to the example according to FIG. 2, here, the applicator unit 2 is formed by a further processing unit, the functionality of which is preserved even during film transfer in the printing machine, that is to say, even in the event that adhesive is transferred onto the sheet 5 in the applicator unit 2, a further processing method is also employed on the sheet 5 in the same applicator unit 2 before the adhesive is applied to the sheet 5 via the applicator device 9.

The further processing device 32 may be, for example, a further printing device or an embossing device or a scoring device or a similar device, as already described above. In the case illustrated here, it is, for example, an embossing device. The embossing device may contain an embossing cylinder 33 which has a female die, while the impression cylinder 7 has a corresponding male die. The sheet 5 can thus also be embossed in the same unit before adhesive application.

In the case illustrated here, methods separated functionally from film transfer are employed on the sheet 5 both in the applicator unit 2 and in the transfer unit 12. In particular, the same method, for example an offset print, or different methods, for example embossing and offset printing methods, may be carried out in both units. In any event, due to the additional method for transferring a transfer layer onto a print carrier, the printing machine loses no functionality.

Figure 4:
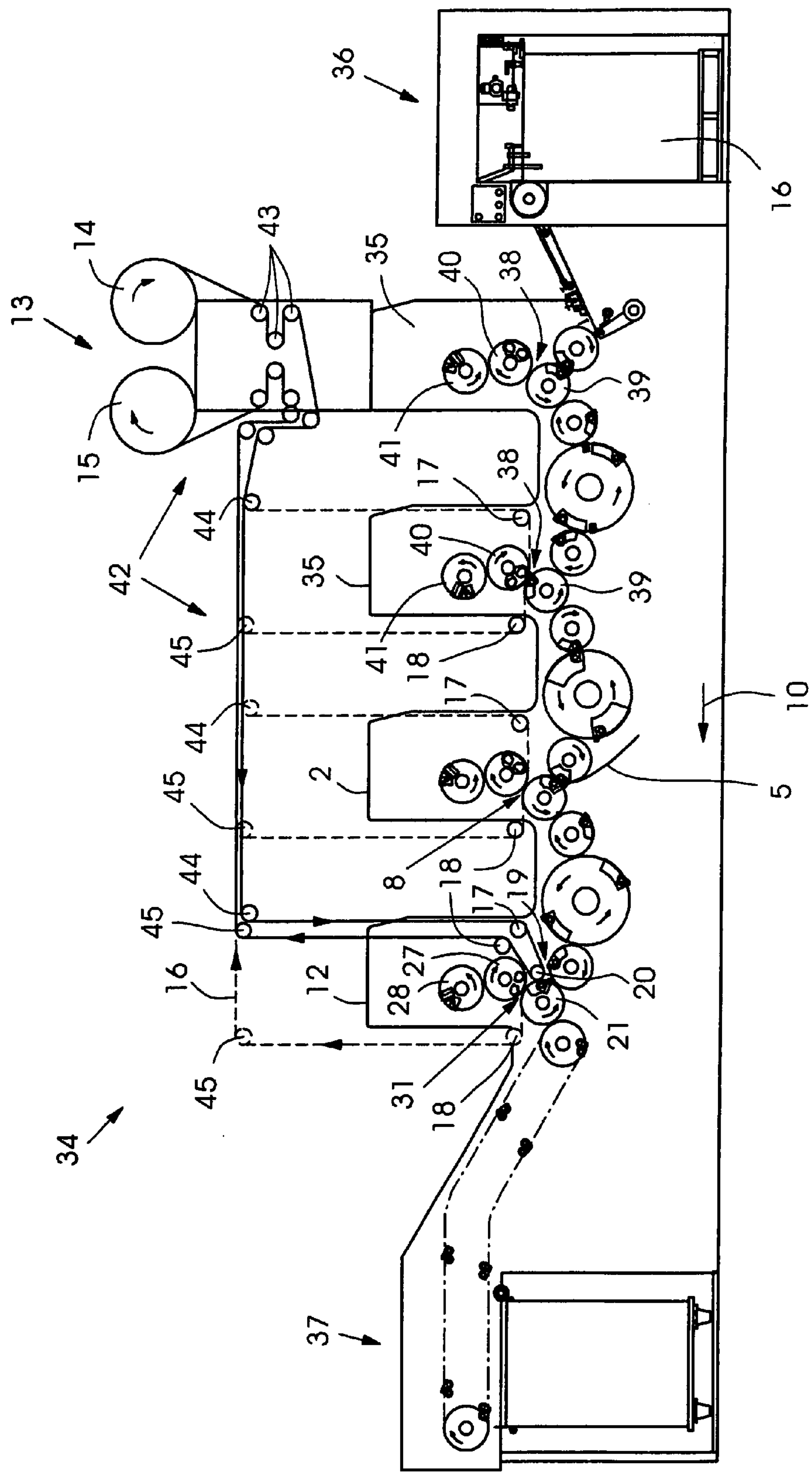
FIG. 4 is a diagrammatic, side view of the film transfer device with variable transfer film web routing.

FIG. 4 shows a further alternative embodiment of a printing machine with the film transfer device 1, a variable routing of the transfer film web 16 becoming possible here.

A printing machine 34 is illustrated, which, in addition to the applicator unit 2 and the transfer unit 12, also has two further printing units 35. The transfer unit 12 and the applicator unit 2 are in this case configured as described with regard to FIG. 2. Alternatively, the applicator unit 2 may also be configured as outlined in FIG. 3. The transfer unit 12 here has an additional offset printing device 26. Consequently, a printing method can be employed on the sheet 5 in each of the two printing units 35 and in the transfer unit 12.

The sheet 5 is led through the printing machine 34 in the transport direction 10. For this purpose, the printing machine 34 has a plurality of sheet transfer cylinders 11. The sheet 5 is transported within the printing machine 34 from a feeder 36 in the transport direction 10, illustrated here by the arrow 10, to a delivery 37. Ink is transferred onto the sheet 5 in the printing units 35. For this purpose, the sheet 5 is led through a printing nip 38 which is formed by an impression cylinder 39 and a rubber blanket cylinder 40. In the printing nip 38, the ink is transferred from the rubber blanket cylinder 40 onto the sheet 5. Furthermore, a printing unit 35 has a plate cylinder 41. By inking and dampening units, not illustrated here, the printing plate tension-mounted on the plate cylinder 41 is inked, so that ink is present only on imaging regions of the printing plate. This ink is transferred onto the print carrier 5 via the rubber blanket cylinder 40. For this operation, an offset blanket or rubber blanket is tension-mounted on the rubber blanket cylinder 40. This rubber or offset blanket is exchangeable. The most diverse possible offset blankets are known in the prior art. In general, the requirements for the offset blanket state that the latter is to be capable of taking up ink effectively and that this ink is transferred with as little residue as possible onto the print carrier.

Moreover, to transfer the transfer layer from the transfer film web 16, the sheet 5 is led through the applicator unit 2. The applicator unit 2 is, as described, a further printing unit of the printing machine 34. As already described, here, adhesive is applied image-to-image onto the sheet 5.

The sheet 5 loaded at least partially with adhesive in the applicator unit 2 is subsequently led into the following transfer unit 12. In the transfer unit 12, film transfer takes place, as described with regard to FIG. 2 and 3, in the transfer nip 19.

For the transfer of the transfer layer onto the sheet 5, the transfer film web 16 is led from a film module 13 to the transfer nip 19 along a film transport path by a film guide device 42.

For this purpose, the film guide device 42 contains various web guide elements 17, 18, 43, 44 and 45. For greater clarity, not all the web guide elements have been identified.

In the film module 13, tension rollers 43 are provided, which ensure a uniform tightening of the transfer film web 16. Economy switching devices may also be provided here, which, for economy switching, ensure that transfer film is transported through the transfer nip 19 substantially only when a transfer of the transfer layer is to take place. Such economy switches are sufficiently known from the prior art. For greater clarity, a corresponding illustration has been dispensed with.

The transfer film web 16 is unrolled from a transfer film stock roll 14, provided here in the upper region of the film module 13, and this may, for example, take place actively, but passive unrolling, in which the transfer film web 16 is drawn from the transfer film stock roll 14, may also be envisaged.

The transfer film web 16 is led through the tension rollers 43 and is supplied by deflection rollers 44 to the transfer unit 12 having the transfer nip 19. As described, the routing of the transfer film web 16 to the transfer nip 19 and away from the latter is implemented via further deflection rollers 17, 18.

A plurality of deflection rollers 44 are located at different positions in the region of the film transport path. By the printing machine 34 being set up accordingly, the transfer film web 16 can be routed selectively to different positions of the printing machine 34 via corresponding deflection rollers 44.

In the example illustrated here, deflection rollers 44 are located in a region of the film transfer path which runs substantially horizontally and consequently substantially parallel to the sheet transport path. In the printing machine 34 illustrated here, the printing nips 38 of the printing units 35 and, selectively, also the applicator nip 8 of the applicator unit 2 may be implemented as transfer nips 19. Moreover, as described in FIG. 2, additional transfer devices 22 may also be provided in each case in the printing units 35 and/or in the applicator unit 2. In particular, it is possible for a transfer device 22 to be provided directly upstream of an applicator device 9 of an applicator unit 2. In this way, double film application one above the other and/or next to one another of the same and/or different types of film can easily be implemented.

Depending on the desired transfer nip 19 in which a film transfer is to be carried out, the transfer film web 16 is deflected from the horizontal via a deflection roller 44 located, for example, above the unit in which the transfer is to take place. In the region of the transfer nip 19, a further deflection roller 17 is positioned, which guides the transfer film web 16 in the direction of the transfer nip 19. The transfer film web 16 is led through the transfer nip 19 and is led again via a further deflection roller 18 substantially vertically upward into a region above the printing machine 34. The two deflection rollers 17, 18 in the region of the transfer nip 19 serve here for stability and for achieving as parallel a run as possible of the sheet 5 and transfer film web 16 through the transfer nip 19. It is, of course, also possible to dispense with these deflection rollers 17, 18 in the region of the transfer nip 19, the transfer cylinder 20 then serving as a further sheet guide element which leads the transfer film web 16 through the transfer nip 19.

The deflection rollers 44 in the region of the various units 2, 12 and 35 are provided above the printing units 35 of the printing machine 34. In addition, further deflection rollers 17, 18 are located in the region of the various printing, applicator or transfer nips 38, 8 or 19. The web routing of the transfer film web 16 can thereby be set up variably with respect to different nips 8, 19, 38.

This possible supply of the transfer film web 16 may, of course, also be extended to further positions on the printing machine 34, for example to other processing units of the printing machine 34. In principle, each pair of rollers which form a common nip forms a potential transfer nip 19. There may therefore be provision for providing deflection rollers 44, 45 in the region of the film transport path and in the region of a selection of potential transfer nips 19 or in the region of all of the transfer nips 19, in order to make it possible to set up the printing machine 34 such that a film transfer can take place in each of these potential transfer nips 19. As a further condition for a potential transfer nip 19, it is necessary merely to ensure that a print carrier 5, together with the transfer film web 16, can also be led through this potential transfer nip 19.

Further deflection rollers 45 are provided downstream of the transfer nip 19, as seen in the direction of advance of the transfer film web 16, in order to deflect the transfer film web 16 once again into a plane which lies substantially parallel to the sheet transport path. Like the deflection rollers 44, the deflection rollers 45 are also in this case assigned to the printing units 35 or to the applicator and transfer unit 2 and 12, in order, in the case of a correspondingly set-up printing machine 34, to allow the transfer film web 16 to be routed from a selected transfer nip 19 to a transfer film collection roll 15. In the setup illustrated here, the transfer film collection roll 15, together with the film module 13, forms a functional unit. The transfer film web 16 may also be routed in the region of the transfer film collection roll 15 via tension rollers 43 or via an economy switching device, not illustrated here.

Overall, the provision of deflection rollers 44 and 45 makes it possible to have a variable transfer film routing to different positions on the printing machine 34. The different positions are in this case preferably potential transfer nips 19 which are formed, for example, by printing, applicator or transfer nips 38, 19, 8. However, other cylinder pairings may also be envisaged here as the transfer nips 19.

In the printing machine 34 illustrated here, the film module 13 is located at the first printing unit 35 which follows the feeder 36. Since the printing unit 35 in this case has only one printing nip 38, the printing nip 38 cannot serve as a transfer nip 19 since the applicator unit 2 for the adhesive would then be absent. Consequently, in this case, deflection rollers 44, 45 which can lead the film into the printing nip 38 are also not illustrated.

By virtue of the illustrated examples of the provision of the transfer device 20 in any desired further processing unit, such as, for example, printing units 35, a highly flexible utilization of the printing machine 34 is possible, without much functionality being lost. Owing to additional variable transfer film web routing, this flexibility can also be appreciably increased. With the exception of the first printing unit 35, any further printing unit 35 of the printing machine can be converted by a transfer device 22 into the transfer unit 12, while preserving its functionality as a printing unit.

In a four-color printing machine, printing ink can thus continue to be transferred onto the sheet, if appropriate with an applied transfer layer, in three printing units. Only one printing unit is required as an applicator unit for adhesive application. If, however, the applicator unit is configured according to the example shown in FIG. 3, even here no functionality is lost.

By a unit being configured simultaneously as an applicator unit and a transfer unit, if the transfer nip 19 of the transfer device 22 is provided upstream of the applicator nip 8, it is possible to apply adhesive in a previous unit and to provide transfer film again in the following unit. If, furthermore, the following unit is used additionally as a further processing unit, then two film transfers may take place, in which case only two printing units or further processing units cannot be utilized further in functional terms, since the combined transfer/applicator unit and the individual applicator unit 2 are provided here. The individual applicator unit 2 can also preserve its functionality according to FIG. 3, so that only the combined transfer/applicator unit is not available for a further processing of the print carrier 5. In the case of two film applications in the printing machine 34, only one printing unit has to be dispensed with for the printing process.

Overall, the flexibility of the printing machine 34 in terms of methods for processing the print carrier, while at the same time having film transfer, can be increased.

We Claim:

1. A printing machine, comprising:

at least one transfer unit for transferring a transfer layer from a carrier film, which together form a transfer film, onto a print carrier, said transfer unit including a film transfer cylinder and an impression cylinder, said film transfer cylinder being thrown onto said impression cylinder and forming with said impression cylinder a transfer nip, the print carrier being transported through said transfer nip along a transport path for a transfer of the transfer layer, said transfer unit being a further processing unit of the printing machine and having at least one further processing device following said transfer nip and acting on the print carrier, said further processing device for being thrown at least temporarily onto said impression cylinder and following said transfer nip, said further processing device having a functionality independent of the film transfer, said further processing unit being a unit for finishing the print carrier by finishing regions of the print carrier without a transferred transfer layer; and at least one applicator unit for an at least regional application of an adhesive onto the print carrier, said applicator unit preceding said transfer unit, and the transfer layer being detached from the carrier film in said transfer unit in regions in which the adhesive is applied to the print carrier.

2. The printing machine according to claim 1, wherein said applicator unit is another further processing unit of the printing machine and, has an applicator device for applying the adhesive to the print carrier and at least one another further processing device for further processing of the print carrier, said another further processing device preceding said applicator device.

3. The printing machine according to claim 2, wherein:

said applicator unit has an applicator impression cylinder; and said applicator device is thrown onto said applicator impression cylinder and with said applicator impression cylinder forms an applicator nip, and said another further processing device is thrown at least temporarily onto said applicator impression cylinder and precedes said applicator device.

4. The printing machine according to claim 1, wherein said further processing device has at least one of a rubber blanket cylinder, one punching cylinder, one cutting unit, one numbering unit, one perforating unit, one structuring unit, one applicator unit for the adhesive, one film transfer unit and one embossing unit.

5. The printing machine according to claim 1, wherein said further processing unit is selected from the group consisting of an offset printing unit, an anilox printing unit, a lacquering unit, a perforating unit, a punching unit, a scoring unit, a numbering unit, a cutting unit, an applicator unit, a film transfer unit, an embossing unit and another printing unit of the printing machine.

6. The printing machine according to claim 1, further comprising a drying device, following said applicator unit and preceding said transfer nip, for predrying the adhesive applied in said applicator unit.

7. The printing machine according to claim 1, wherein the adhesive is a UV adhesive applied in said applicator unit; and further comprising a UV device, following said applicator unit and preceding said transfer nip, for acting with UV radiation upon the UV adhesive applied in said applicator unit, for activating the UV adhesive.

8. A method for transferring a transfer layer from a carrier film, which together form a transfer film, onto a print carrier in a printing machine, which comprises the steps of:

applying an adhesive at least regionally onto the print carrier in an applicator unit;

transferring the transfer layer from the carrier film onto the print carrier in a following transfer unit in a transfer nip formed by a film transfer cylinder and an impression cylinder; and carrying out a further processing of the print carrier in the transfer unit having a further processing device following the transfer nip, after the transfer layer of the carrier film has been transferred onto the print carrier;

throwing the further processing device for the further processing of the print carrier, at least temporarily, onto the impression cylinder which, together with the film transfer cylinder, forms the transfer nip, the further processing device following the transfer nip;

performing the further processing of the print carrier by one of:

loading the print carrier with printing ink or lacquer by one of an anilox printing, offset printing and other printing method; and perforating, punching, scoring, cutting or embossing the print carrier.

9. The method according to claim 8, which further comprises performing the further processing of the print carrier for regions or print carriers which are not occupied by the transfer layer.

* * * * *